United States Patent
Daigle et al.

(10) Patent No.: US 10,256,862 B2
(45) Date of Patent: Apr. 9, 2019

(54) SYSTEM AND METHOD FOR DISPLAYING DEVICE-SPECIFIC INFORMATION FOR A SMART DEVICE

(71) Applicant: iDevices, LLC, Avon, CT (US)

(72) Inventors: Michael Daigle, Glastonbury, CT (US); Brian Gallant, Burlington, CT (US); Shawn Monteith, Burlington, CT (US); Hillary Tracy, West Hartford, CT (US); Michael Tetreault, Simsbury, CT (US)

(73) Assignee: iDevices, Avon, CT (US)

( * ) Notice: Subject to any disclaimer, the term of this patent is extended or adjusted under 35 U.S.C. 154(b) by 188 days.

(21) Appl. No.: 15/254,445

(22) Filed: Sep. 1, 2016

(65) Prior Publication Data
US 2017/0063426 A1    Mar. 2, 2017

Related U.S. Application Data

(60) Provisional application No. 62/212,842, filed on Sep. 1, 2015, provisional application No. 62/377,824, filed on Aug. 22, 2016.

(51) Int. Cl.
| | |
|---|---|
| *H04B 1/40* | (2015.01) |
| *H01R 13/74* | (2006.01) |
| *H04W 12/06* | (2009.01) |
| *H04W 76/02* | (2009.01) |
| *H01R 25/00* | (2006.01) |

(52) U.S. Cl.
CPC .............. *H04B 1/40* (2013.01); *H01R 13/74* (2013.01); *H01R 25/006* (2013.01); *H04W 12/06* (2013.01)

(58) Field of Classification Search
None
See application file for complete search history.

(56) References Cited

U.S. PATENT DOCUMENTS

| | | |
|---|---|---|
| 3,421,085 A | 1/1969 | Erickson et al. |
| 4,460,125 A | 7/1984 | Barker et al. |
| 5,914,845 A | 6/1999 | Chase |
| 8,931,400 B1 | 1/2015 | Allen |
| 2005/0136972 A1 | 6/2005 | Smith et al. |
| 2006/0148403 A1 | 7/2006 | Martin |
| 2009/0207034 A1 | 8/2009 | Tinaphong et al. |
| 2010/0060187 A1 | 3/2010 | Newman, Jr. et al. |
| 2011/0062896 A1* | 3/2011 | Chou .................... G04G 15/006 315/362 |
| 2011/0261511 A1 | 10/2011 | Alderson et al. |

(Continued)

OTHER PUBLICATIONS

Barry de la Rosa, BT Home Hub 3 review, Mar. 16, 2011, www.expertreviews.co (Year: 2011).*

(Continued)

*Primary Examiner* — Dimary S Lopez Cruz
(74) *Attorney, Agent, or Firm* — Dority & Manning, P.A.

(57) ABSTRACT

An in-wall smart device comprises a smart device assembly or housing mountable on or within a wall or panel; and an information tab or panel displaying thereon smart device specific information in order to provision, pair, authenticate, communicate and/or join a wireless network. The information tab or panel may define (i) a first condition or position where the device specific information is concealed, and (ii) a second condition or position where the device specific information is exposed for viewing.

26 Claims, 22 Drawing Sheets

(56) References Cited

U.S. PATENT DOCUMENTS

| | | |
|---|---|---|
| 2011/0320636 A1 | 12/2011 | Young et al. |
| 2012/0060044 A1 | 3/2012 | Jonsson et al. |
| 2013/0069617 A1 | 3/2013 | Lee |
| 2013/0234534 A1 | 9/2013 | Lin |
| 2013/0257315 A1 | 10/2013 | Restrepo et al. |
| 2013/0338844 A1 | 12/2013 | Chan et al. |
| 2013/0339766 A1 | 12/2013 | Chen et al. |
| 2014/0070959 A1 | 3/2014 | Bhargava et al. |
| 2014/0103121 A1 | 4/2014 | VanderWel |
| 2014/0163751 A1 | 6/2014 | Davis et al. |
| 2015/0028096 A1 | 1/2015 | Kim et al. |
| 2015/0060133 A1* | 3/2015 | Goodsell .............. H05K 5/0252 174/520 |

OTHER PUBLICATIONS

International Search Report and Written Opinion dated Nov. 28, 2016, for International Application No. PCT/US16/49931. 13 pages.
Edimax Networking People Together—Quick Installation Guide, 23 pages.

* cited by examiner

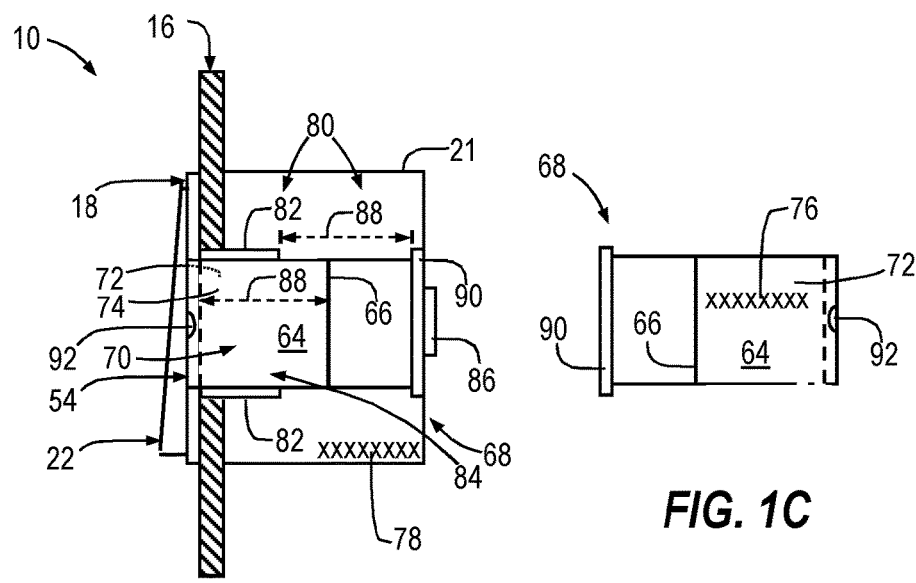
FIG. 1B
FIG. 1C
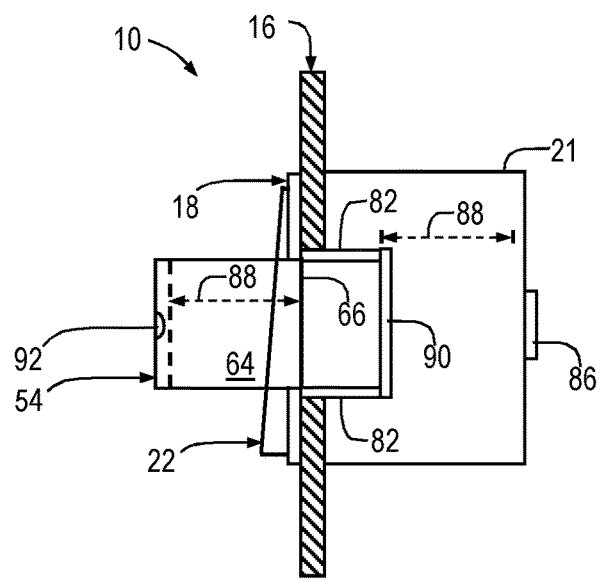
FIG. 1E

SYSTEM AND METHOD FOR DISPLAYING DEVICE-SPECIFIC INFORMATION FOR A SMART DEVICE

CROSS-REFERENCE TO RELATED PATENT APPLICATION

This patent application claims the benefit of U.S. Provisional Patent Application Ser. No. 62/377,824, filed Aug. 22, 2016, entitled "System and Method for Displaying Device Specific Information for a Smart Device," and claims the benefit of U.S. Provisional Patent Application Ser. No. 62/212,842, filed Sep. 1, 2015, entitled "System and Method for Displaying Device Specific Information for In-Wall Smart Device," both of which are hereby expressly incorporated by reference in their entirety as part of the present disclosure.

FIELD OF THE INVENTION

The present invention relates generally to smart devices, including smart devices having device specific information.

BACKGROUND OF THE INVENTION

Device information specific to a particular wireless smart device (e.g., pin code, MAC address, serial number, IP address, service set identifier, QR code, barcode, data matrix, etc.) is required to allow the smart device to provision/pair/authenticate/communicate and/or join a wireless network (e.g., receive information from and/or transmit information to one or more devices via a wireless network, e.g., a personal area network, e.g., a Bluetooth or WiFI personal area network). As part of a process to achieve the above, a user typically enters the device specific information into an application through a PC, tablet or smart phone, or otherwise utilizes the device specific information. Oftentimes, the device specific information is located on the device itself.

SUMMARY OF THE INVENTION

Previously-known in-wall smart devices, such as single or double on/off toggle, paddle or rocker switches, single or double pole dimmer switches and wall outlets, each of which may be referred to as a "smart switch," present a problem. The device specific information that would typically be displayed on the body of a smart device is not accessible to the user once the smart switch is wall mounted or otherwise installed in a wall, such as in a conventional wall mounted electrical box. In addition to requiring the device specific information during the initial install of the smart switch, configuration changes of the wireless network (e.g., internet service provider changes, hardware changes (such as modem, wireless router, PC, tablet or smart phone), and property sale or rental property tenant changes) require the user to reference to the device specific information at a later date. Keeping track of the device specific information for each wall-mounted smart device or smart switch, such as those installed in a home, can be a difficult challenge.

In at least some embodiments, it is an object to overcome one or more of the above-described problems and/or challenges.

In one aspect, an in-wall smart device has a smart device assembly or housing mountable on or within a wall or panel; and an information tab or panel or other structure displaying thereon smart device specific information capable of being used to perform one or more of provision, pair, authenticate, communicate or join a network.

In another aspect, an in-wall smart device includes a smart device assembly or housing mountable on or within a wall or panel; and first means displaying thereon smart device specific information for one or more of provisioning, pairing, authenticating, communicating or joining a wireless network.

In at least some embodiments, the invention has an advantage of the device specific information being accessible to a user after or while the smart device is mounted in wall. In at least some embodiments where the device specific information is accessible without removing the smart device from the wall or moving the smart device from its mounted or installed position within the wall, the device specific information is easily and conveniently accessed.

Other aspects and embodiments and/or possible benefits and advantages should be apparent from the disclosure herein. It should be understood, however, that any such possible benefits and/or advantages are not required in all embodiments.

BRIEF DESCRIPTION OF THE DRAWINGS

FIG. 1B is a side, partial cross sectional view (taken in the direction A-A shown in FIG. 1) of the smart device of FIG. 1A, with an information tab in a retracted state and a first position, in accordance with some embodiments;

FIG. 1C is a side view (taken in the direction B-B shown in FIG. 1) of the information tab, in accordance with some embodiments;

FIG. 1E is a side, partial cross sectional view (taken in the direction A-A shown in FIG. 1), of the smart device of FIG. 1A with the information tab in an extended state and second position, in accordance with some embodiments;

DETAILED DESCRIPTION OF EMBODIMENTS

In accordance with at least some embodiments, an exposed portion, e.g., a front of, an in-wall smart device, such as a smart switch, incorporates an information tab that can display the device specific information that is required to allow the smart switch to provision/pair/authenticate/communicate/join a wireless network. The information tab is accessible to the user even in conjunction with a conventional switch face plate and/or other type of switch or device faceplate installed. After the user installs the smart switch into the wall and attaches a standard or other type of faceplate, the user may access the information tab that for display of the device specific information that is required to allow the smart switch to provision/pair/authenticate/communicate/join a wireless network. Should the user need to subsequently access the device specific information, the user can simply access the information tab to obtain the device specific information. As will be described below, in some embodiments, the information tab may be incorporated into the bezel of the smart switch, which bezel may have an overall outline similar to a conventional or known bezel, e.g., to be usable with a conventional faceplate. Alternatively, in some embodiments, the information tab may be located on an underside of a toggle button or other switch and the toggle button hinges or can be moved to access the information tab. In some embodiments, the information tab may be integrated into a face of a toggle switch.

Figure 1A:
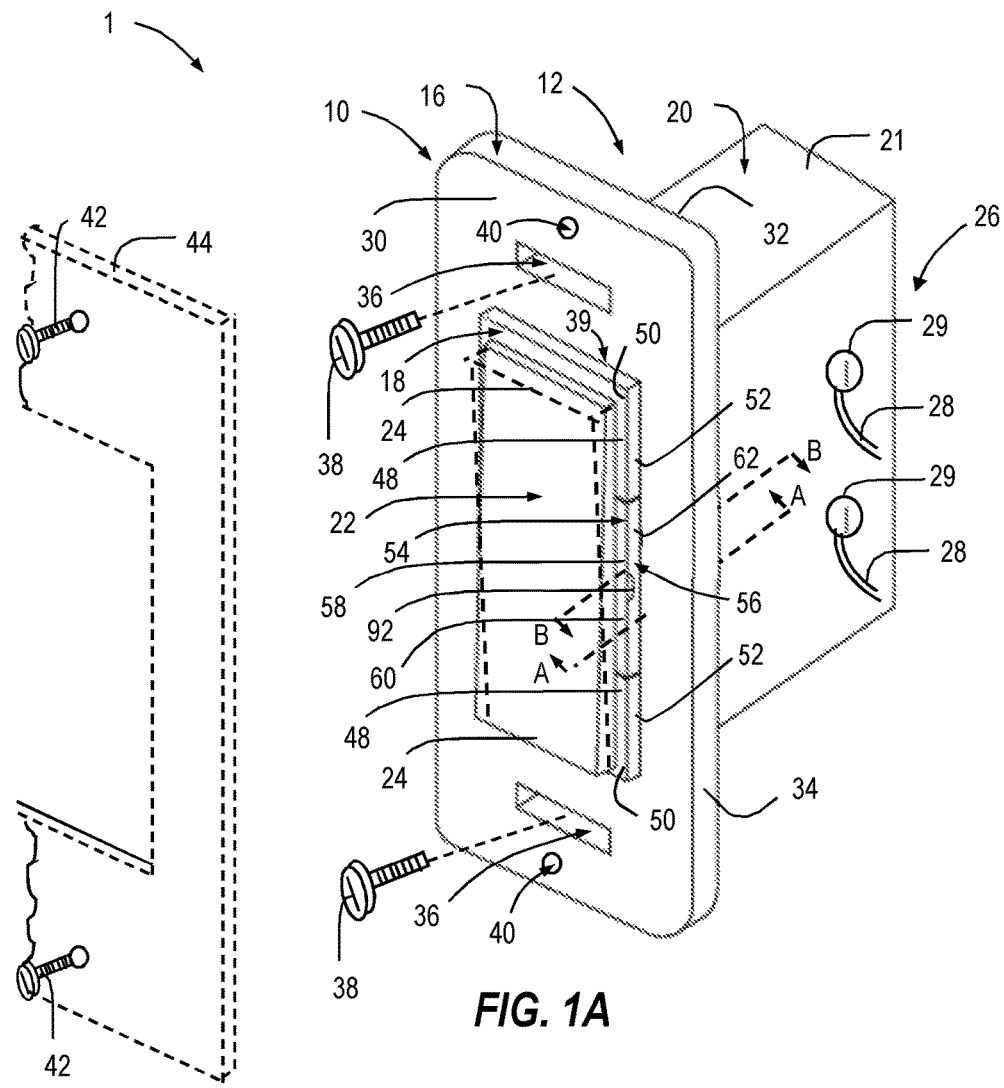
FIG. 1A is a perspective view of system that includes a smart device, shown in a first state, in accordance with some embodiments.

FIG. 1A is a front perspective view of a system 1 comprising a smart device 10 that includes a structure that can display device specific information that is accessible to a user after or while the smart device is installed in or otherwise mounted on a wall, in accordance with some embodiments.

Referring to FIG. 1A, the smart device 10, which is shown in the form of a smart paddle or rocker switch, and in a first state, may include a body 12, a mounting plate 16 and a bezel 18. The body 12 may include a smart switch assembly 20, which in turn may include a housing 21 and a manually engageable actuator 22.

The housing 21 may contain various components of the smart device 10 and may be configured to be installed, in whole or in part, in a wall mounted electrical box, which may be a conventional wall mounted electrical box or any other type of wall mounted electrical box, or an opening or receptacle in the wall.

A wall may have any configuration suitable to a situation. A wall may have any orientation. In some embodiments, a wall may be oriented vertically. In some embodiments, a wall may be oriented horizontally (e.g., a ceiling wall). It should be understood that the term "wall," into which a switch, plug or other electronic device may be installed or mounted, may refer to any part of an object or construction into which a switch, plug or other electronic device may be installed or mounted.

The manually engageable actuator 22 may allow a user to manually change an on/off state of the smart switch and/or control another operation of the smart switch/device. It may have any suitable form and/or configuration. In the illustrated embodiment, the manually engageable actuator 22 has a surface or panel 24 that is pivotally movable from a centered, non-actuated position to a first position (shown in solid line) and from the centered, non actuated position to a second position (shown in dashed line) to change the on/off or other state of the smart switch. For example, if the smart switch is in an off state, moving the surface or panel 24 from the centered, non actuated position to the first position may cause the smart switch to transition to an on state. With the smart switch in the on state, moving the surface or panel 24 from the centered, non-actuated position to the second position may cause the smart switch to transition back to the off state. In some other embodiments, the surface or panel 24 may be movable from a centered, non actuated position to the first position (but not the second position) to toggle the on/off or other state of the smart switch. For example, if the smart switch is in an off state, moving the surface or panel 24 from the centered, non actuated position to the first position may cause the smart switch to transition to an on state. Moving the surface or panel 24 from the centered, non actuated position to the first position again may cause the smart switch to transition back to the off state. In some embodiments, the surface or panel 24 operates in any conventional manner as should be understood by those of ordinary skill in the art.

The smart switch assembly 20 may further include one or more electrical terminals 26 to receive one or more electrical conductors 28, e.g., electrical wires, to be electrically connected to the smart switch. As is known, electrical terminals 26 may include threaded screws, e.g., threaded screws 29, that screw into a housing or other structure, e.g., as shown, and/or any other type of electrical terminal(s) external and/or internal to a housing or other structure.

The mounting plate 16 may be coupled to the body 12 and may be used to install or otherwise mount the smart switch on or within a wall or panel. The mounting plate 16 may have any suitable form and/or configuration. In some embodiments, the mounting plate 16 has a front surface 30, a rear surface 32 and side surfaces, e.g., side surface 34. In at least some embodiments, the mounting plate 16 may define one or more openings 36, which are slot-shaped in the embodiment shown, that are configured to receive one or more screws 38 or other type(s) of fastener(s) configured to be fastened to, and thereby retain the smart switch to, a wall mounted electrical box or other receptacle mounted in the wall. The mounting plate 16 may further define an opening 39 through which a portion of the body 12 extends. The mounting plate 16 may further define one or more openings 40 configured to receive one or more screws 42 or other type(s) of fastener(s) to fasten a face or cover plate 44 (shown in dash) to the mounting plate 16.

The bezel 18 may define a frame around the portion of the body 12 that extends through the opening 39 in the mounting plate 16. As such, the bezel 18 may have a shape and/or configuration that depend at least in part on such portion of the body 12. For example, if the portion of the body 12 that extends through the mounting plate 16 has a rectangular shaped circumference, e.g., as shown, the bezel 18 may have a shape of a rectangular frame. If the portion of the body 12 that extends through the mounting plate 16 has a circular circumference, the bezel 18 may have a shape of a circular frame.

The bezel 18 may have an exterior surface 48, which may include a front surface 50 and a side surface 52.

In some embodiments, the bezel 18, or one or more portions thereof, may be disposed on the mounting plate 16. As used herein, the phrase "disposed on" means "disposed directly on, at least in part" and/or "disposed indirectly on". Unless stated otherwise, the term "on" does not necessarily mean "on top of" since relative position (top, bottom, above or below) depends on orientation.

As stated above, the smart device includes a structure that can display device specific information that is accessible to a user after or while the smart device is installed in or otherwise mounted on a wall, in accordance with some embodiments.

In the illustrated embodiments, the bezel 18 includes a tab 54 that is slidably (or otherwise movably) disposed in the smart device 10 and can display device specific information that is accessible to a user after or while the smart device is installed in or otherwise mounted on a wall, in accordance with some embodiments.

The tab 54 is shown in a retracted state in FIGS. 1A and 1B, in which the tab 54 is in a first position relative to the rest of the bezel 18 and/or smart device 10. The tab 54 may include a first portion 56 that is exposed and visible from the front of the smart device 10 with the tab 54 in such position. Other portions of the tab 54 may be concealed and not visible from the front of the smart device 10 with the tab 54 in such position.

The front portion 56 of the tab 54 has an exterior surface 58, which may include a front surface 60 and a side surface 62. With the tab 54 retracted and in the first position, the front surface 60 of the tab 54 may be flush or substantially flush (sometimes collectively referred to herein as at least substantially flush) with the front surface 50 of the bezel 18. The side surface 62 of the tab 54 may be flush with the side surface 52 of the bezel 18.

FIGS. 1B-1C show additional details of the smart device 10, with the tab 54 in the retracted state and first position, in accordance with some embodiments. In particular, FIG. 1B is a side, partial cross sectional view (taken in the direction A-A) of the smart device, with the tab 54 in the retracted state and first position, in accordance with some embodiments. FIG. 1C is a side view (taken in the direction B-B) of the tab, in accordance with some embodiments.

Referring to FIGS. 1B-1C, the tab 54 may further include an extendable/retractable portion 64, a hinge 66 and a rear portion 68. The extendable/retractable portion 64 may have an exterior surface 70, which may include a first side 72 and a second side 74. One or both of the two sides 72, 74 may display device specific information 76. The device specific information 76 is shown being displayed on the first side 72, however, the device specific information 76 could also or alternatively be displayed on the second side 74. In the illustrated embodiment, the device specific information 76 is represented by a sequence of eight characters "XXXXXXXX". However, this does not mean that the device specific information must have exactly eight characters. Nor does it mean that the device specific information include the character "X". The device specific information may be of any suitable or desired content and/or configuration.

In at least some embodiments, the device specific information 76, or a portion thereof, may also be displayed on a front, side, or rear exterior surface of the housing 21 and/or on one or more other exterior surfaces of the smart device 10, which may be concealed or otherwise not visible from the front of the smart device 10 after or while the smart device 10 is installed in or otherwise mounted on a wall or panel.

The hinge 66 may be disposed between the extendable/retractable portion 64 and the rear portion 68. As will be further described below, the hinge 66 may allow the extendable/retractable portion 64 to pivot or otherwise rotate relative to the rear portion 68 and/or the bezel 18. In some embodiments, the hinge 66 may comprise a living hinge and/or any other type(s) of hinge(s). In some embodiments, the tab 54 may be formed of a flexible sheet material. In some embodiments, the sheet material is a polymeric material.

The smart device 10 may further include one or more structures 80 to slidably (or otherwise movably) mount or otherwise retain the tab 54 to the smart device 10. In some embodiments, the bezel 18 may include first and second walls 82 or other structures that define a channel or other type of recess 84, within which one or more portions of the tab 54 may be slidably (and/or otherwise movably) disposed. The smart device may further include one or more stops to limit travel 76 by the tab 54 so that a portion of the tab 54 remains in the channel under all conditions. In some embodiments, a wall 86 or other type of stop may extend into a path of the tab 54 or otherwise limit an amount 88 by which the tab 54 can travel while retracting so that a portion of the tab remains in the channel 84 when the tab 54 is fully retracted. Another wall 90 or other type of stop may limit the amount 88 by which the tab 54 can travel in a forward direction so that a portion of the tab 54 remains in the channel 84 when the tab 54 is fully extended.

Referring again to FIG. 1A, the exterior surface 58 of the tab 54 may further include a handle or other type of grip 92, which may be pulled and/or pushed, to cause the tab 54 to slide or otherwise move from a retracted state, in which the tab 54 is in the first position, to an extended state in which the tab 54 is in a second position relative to the rest of the bezel 18 and/or smart device 10.

As used herein, the phrase "extended state" means a state in which the tab 54 extends outwardly from the smart device 10 and/or in any other direction(s) as compared to the position of the tab 54 in the first position.

In some embodiments, the grip 92 is manually engageable by a finger, fingernail or hand-held device to engage and move the tab 54 from the first to the second position. In some embodiments, the grip 92 defines a recess that is engageable by a pen, paperclip or similar tool. In some embodiments, the grip 92 is defined by a fingernail groove formed in the exterior surface of the tab 54.

Figure 1D:
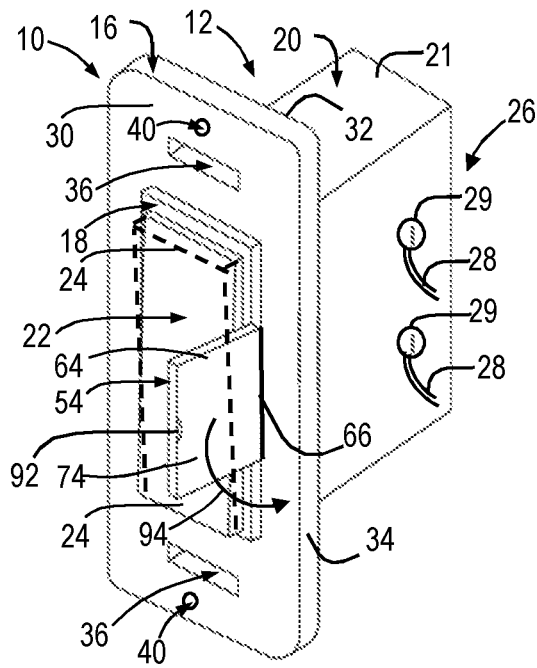
FIG. 1D is a perspective view of the smart device of FIG. 1A in a second state, in which the information tab is in an extended state and in a second position, in accordance with some embodiments.

FIG. 1D is a front perspective view of the smart device 10 in a second state, in which the tab 54 is in an extended state and a second position relative to the rest of the bezel 18 and/or smart device 10, in accordance with some embodiments.

FIG. 1E is a part side view, part cross sectional view, in the direction A-A (FIG. 1A), of the smart device 10, with the tab 54 in an extended state and the second position, in accordance with some embodiments.

In at least some embodiments, with the tab 54 in an extended state and the second position, the device specific information 76 may be exposed for viewing by a user even though the smart device 10 may be mounted or otherwise installed in a wall or panel.

In some embodiments, after the tab 54 is in an extended state and the second position, the extendable/retractable portion 64 of the tab 54 may be pivoted or otherwise rotated or moved 94 to a third position relative to the second position and/or the rest of the bezel 18 and/or smart device 10.

Figure 1F:
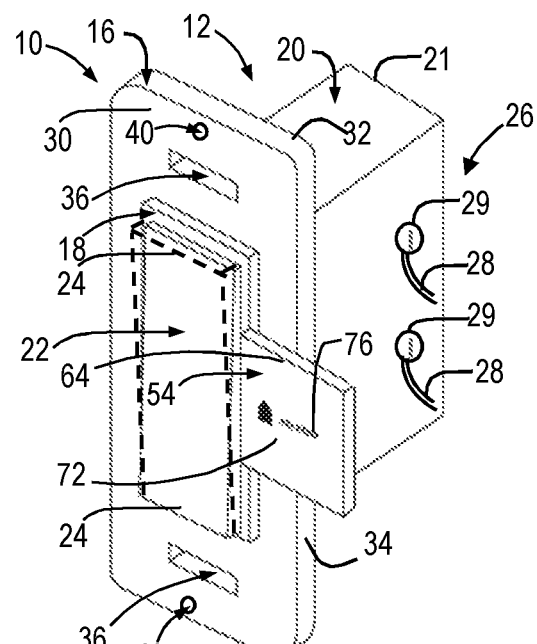
FIG. 1F is a perspective view of the smart device of FIG. 1A in a third state, in which the tab is in an extended state and in a third position, in accordance with some embodiments.

FIG. 1F is a front perspective view of the smart device 10 in a third state in which the tab 54 is in an extended state and the extendable/retractable portion 64 is in the third position relative to the rest of the bezel 18 and/or smart device 10.

In the third position, the first side 72 of the extendable/retractable portion 64, and the device specific information 76 may be exposed and positioned for easier viewing (e.g., visible from the front of the smart device 10 and/or to a user positioned at the front of the smart device 10).

The ability to pivot and/or otherwise move the tab 54 to the third position may allow a user to more easily view the device specific information 76.

As stated above, a user may enter the device specific information 76 into an application through a PC, tablet or smart phone.

As stated above, device information specific to a particular wireless smart device (e.g., pin code, MAC address, serial number, IP address, service set identifier, QR code, barcode, data matrix, etc.) is required to allow the smart device to provision/pair/authenticate/communicate and/or join a wireless network (e.g., receive information from and/or transmit information to one or more devices via a wireless network, e.g., a Wi-Fi network, a personal area network (e.g., Z-Wave, ZigBee, Bluetooth) and/or any other type of personal or non personal area network).

In at least some embodiments, the mounting plate 16 and/or bezel 18 may be manufactured separately from the smart switch assembly 20 and housing 21 and subsequently attached or otherwise coupled thereto. In some embodiments, the tab 54 may be snap fit, press fit and/or friction fit and releasably retained within the bezel 18 with the tab 54 in the second position. In some embodiments, the tab may be removable from the smart device, e.g., with the tab 54 in the second position.

In some embodiments, the smart switch is at least one of a single or double on/off toggle, paddle or rocker switch, a single or double pole dimmer switch, a combined on/off and dimmer switch, a combined light switch and fan control, a combined light switch and other appliance control, or a power outlet.

As will be further described below with respect to FIGS. 4A-4B, in some embodiments, the manually-engageable actuator 22 is a paddle or rocker switch actuator, and in the first position, the tab or panel is retracted within a side wall of the paddle or rocker switch actuator 22.

In some embodiments, the tab may be spring loaded and/or biased in the direction from the first position toward the second position. The tab may be releasably held in the first position against the spring loading and/or biasing, e.g., by a detent, releasable catch, friction, or other suitable mechanism, as should be understood by those of ordinary skill in the art. In the first position, for example, the tab may be depressible to release the tab from the first position and allow the spring to move the tab from the first position to the second position.

In some embodiments, the tab may be approximately rectangular. In some embodiments, the tab displays the smart device specific information on a surface that may be approximately rectangular and define a width of at least about 2.8 mm, and a length of at least about 21.5 mm.

In some embodiments, one or more features and/or functions of the smart device 10 may be implemented in accordance with one or more aspects of one or more embodiments of any of the following co-pending patent applications, each of which is hereby expressly incorporated by reference in its entirety as part of the present disclosure: U.S. patent application Ser. No. 14/823,732, filed Aug. 11, 2015, entitled "Multifunction Pass-Through Wall Power Plug with Communication Relay and Related Method," published as U.S. Patent Application Publication No. 2016/0044447 A1 on Feb. 11, 2016, which claims priority to U.S. Provisional Application No. 61/999,914, filed Aug. 11, 2014; and U.S. patent application Ser. No. 14/988,590, filed Jan. 5, 2016, entitled "TOT Communication Bridging Power Switch," published as U.S. Patent Application Publication No. 2016/0209899 A1 on Jul. 21, 2016, which claims priority to U.S. Provisional Application No. 62/100,000, filed Jan. 5, 2015.

Figure 1G:
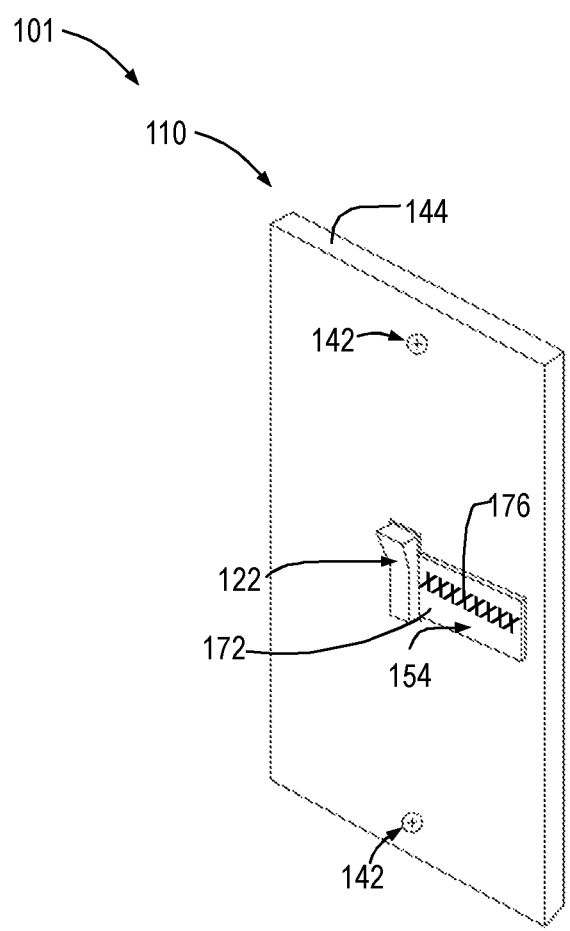
FIG. 1G is a perspective view of another system that includes a smart device, in accordance with some embodiments.

FIG. 1G is a perspective view of a system 101 comprising a face or cover plate 144 attached to a smart device 110 that includes a structure that can display device specific information that is accessible to a user after or while the smart device is installed in or otherwise mounted on a wall, in accordance with some embodiments. The system 101 may be similar to the system 1 (except where otherwise noted, like reference numerals differing only by the presence of the numeral "1" in the hundreds place are used to indicate like or similar elements), described above in association with FIGS. 1A-1F, except that the smart device 110 has a smart switch that includes a smart toggle, paddle or rocker switch with a manually engageable switch actuator 122 that is physically smaller than the manually engageable switch actuator 22.

The face or cover plate 144, which may be a conventional face or cover plate or any other type of face or cover plate, is shown installed around the manually-engageable switch actuator or toggle 122 of the smart device 110.

Figure 2A:
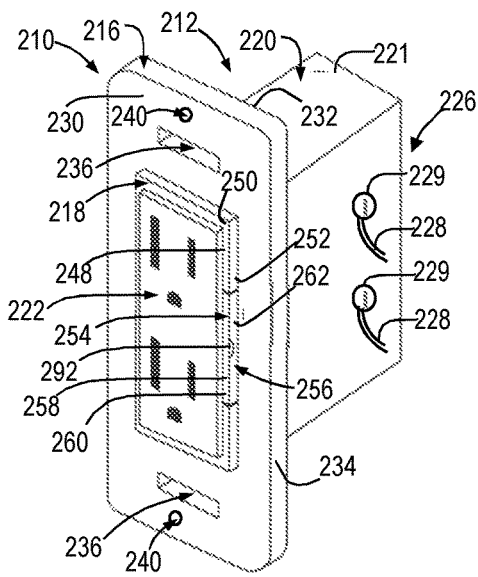
FIG. 2A is a perspective view of another smart device in a first state in accordance with some embodiments.
Figure 2B:
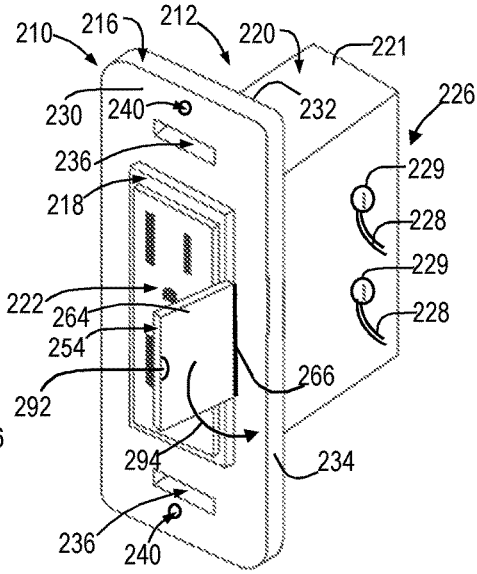
FIG. 2B is a perspective view of the smart device of FIG. 2A in a second state in accordance with some embodiments.
Figure 2C:
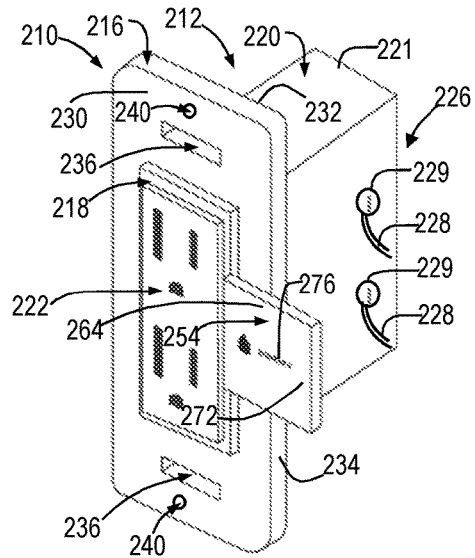
FIG. 2C is a perspective view of the smart device of FIG. 2A in a third state in accordance with some embodiments.

FIGS. 2A-2C are perspective views of another smart device 210 that includes a structure that can display device specific information that is accessible to a user after or while the smart device 210 is installed in or otherwise mounted on a wall, in accordance with some embodiments. The smart device 210 may be similar to the smart device 10 (except where otherwise noted, like reference numerals differing only by the presence of the numeral "2" in the hundreds place are used to indicate like or similar elements) described above in association with FIGS. 1A-1F except that the smart device 210 includes a power outlet 222 rather than a smart switch that includes a manually engageable actuator.

FIG. 2A shows the smart device in a first state, in which the information tab is retracted and in a first position, in accordance with some embodiments. FIG. 2B shows the smart device in a second state, in which the information tab is in an extended state and in a second position, in accordance with some embodiments. FIG. 2C shows the smart device in a third state, in which the tab is in an extended state and in a third position, in accordance with some embodiments.

Figure 3:
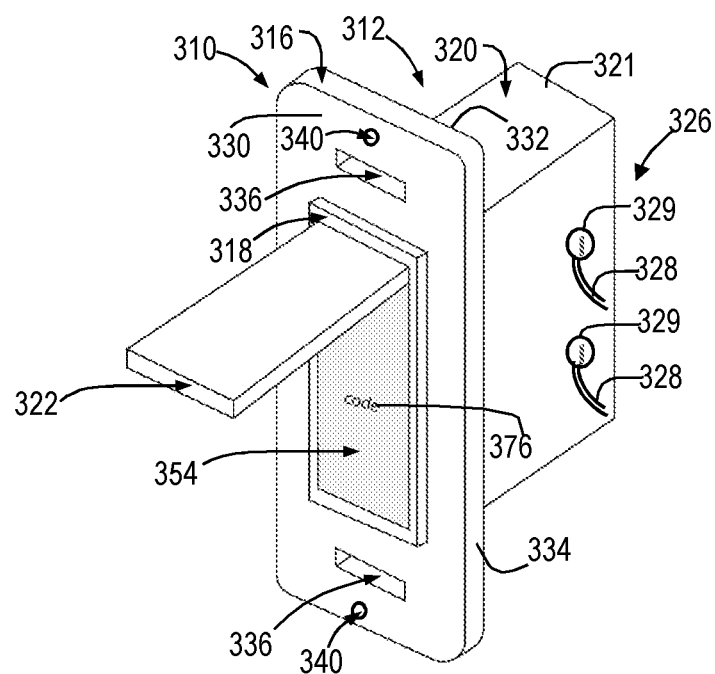
FIG. 3 is a perspective view of another smart device in accordance with some embodiments.

FIG. 3 is a perspective view of another smart device 310 that includes a structure that can display device specific information that is accessible to a user after or while the smart device is installed in or otherwise mounted on a wall, in accordance with some embodiments. The smart device 310 may be similar to the smart device 10 (except where otherwise noted, like reference numerals differing only by the presence of the numeral "3" in the hundreds place are used to indicate like or similar elements) described above in association with FIGS. 1A-1F except that the smart device 310 has an information tab 354 disposed under a toggle button, rocker, or paddle type of manually engageable switch actuator 322 of the smart device 310, and the toggle button, rocker, or paddle type of manually engageable switch actuator 322 is hinged, e.g., to another portion of the assembly 320 in order to allow access to the information tab 354 and the device specific information thereon 376.

In some embodiments, the information tab 354 is fixedly attached to one or more structures of the smart device 310 and/or not movable relative thereto.

Figure 4A:
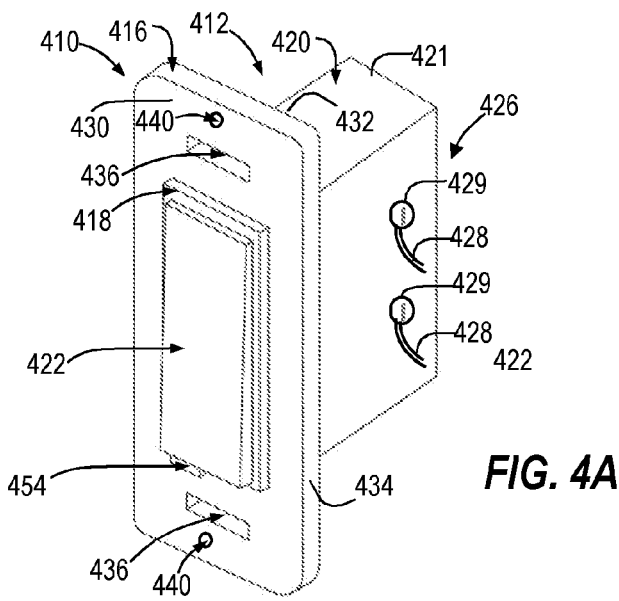
FIG. 4A is a perspective view of another smart device in a first state in accordance with some embodiments.
Figure 4B:
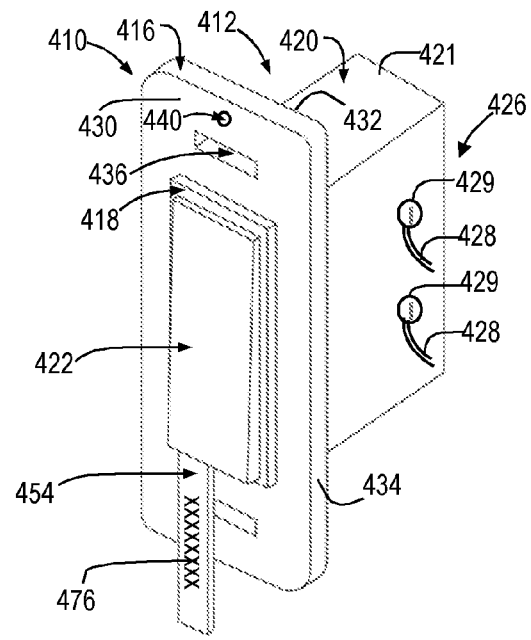
FIG. 4B is a perspective view of the smart device of FIG. 4A in a second state in accordance with some embodiments.

FIGS. 4A-4B are perspective views of another smart device 410 that includes a structure that can display device specific information that is accessible to a user after or while the smart device is installed in or otherwise mounted on a wall, in accordance with some embodiments. The smart device 410 may be similar to the smart device 10 (except where otherwise noted, like reference numerals differing only by the presence of the numeral "4" in the hundreds place are used to indicate like or similar elements) described above in association with FIGS. 1A-1F except that the smart device 310 has an information tab 454 integrated into a face of a toggle button, paddle or rocker type of manually engageable switch actuator 422 of the smart switch. In some embodiments, the tab 454 is slidably attached to the manually engageable switch actuator 422.

In FIG. 4A, the tab 454 is in a retracted (or partially retracted) positioning. In FIG. 4B, the tab 454 is extended out of the toggle, paddle or rocker type of manually engageable switch actuator 422 in order to allow a user to view the device specific information 476 on the tab 454.

FIGS. 5A-5I are views of another smart device 510 that includes a structure that can display device specific information that is accessible to a user after or while the smart device 510 is installed in or otherwise mounted on a wall, in accordance with some embodiments. The smart device 510 may be similar to the smart device 10 (except where otherwise noted, like reference numerals differing only by the presence of the numeral "5" in the hundreds place are used to indicate like or similar elements) described above in association with FIGS. 1A-1F except that (1) the smart device 510 includes an information tab 554 that is disposed in a top or other portion of the bezel 518 that is in register or substantially in register (sometimes referred to herein as at least substantially in register) with a longitudinal axis 595 of the smart switch, (2) an extendable/retractable portion 564 of the information tab 554 pivots or otherwise rotates toward the smart switch and/or in front of a portion of the smart switch, (3) a side 572 of the information tab 554 that displays device specific information 576 faces away from the smart switch, and (4) the bezel 518 includes a recess or other opening 596 in register or substantially in register with a grip 592 defined by the information tab 554 to allow easier access to the grip 592.

In some embodiments, the smart device 510 may further include a built-in lighting system that includes a light 598. The built-in lighting system may have features and/or may have methods of operation that are the same as or similar to (sometimes referred to herein as at least similar to) one or more features and/or one or more methods of operation in one or more embodiments of one or more lighting systems, or portion(s) thereof, built into one or more smart devices disclosed in any of the co-pending patent applications disclosed above, which as stated above, are expressly incorporated by reference in their entirety as part of the present disclosure.

In some embodiments, the light 598 may have an oval or other elongated shape (as illustrated in the embodiment of FIGS. 5A-5I), or it may have any other shape. In some embodiments, such as the embodiment illustrated in FIGS. 5A-5I, the light 598 may be disposed in a central, substantially central, and/or may be located in any other portion(s) of a front surface of the smart device 510.

Figure 5A:
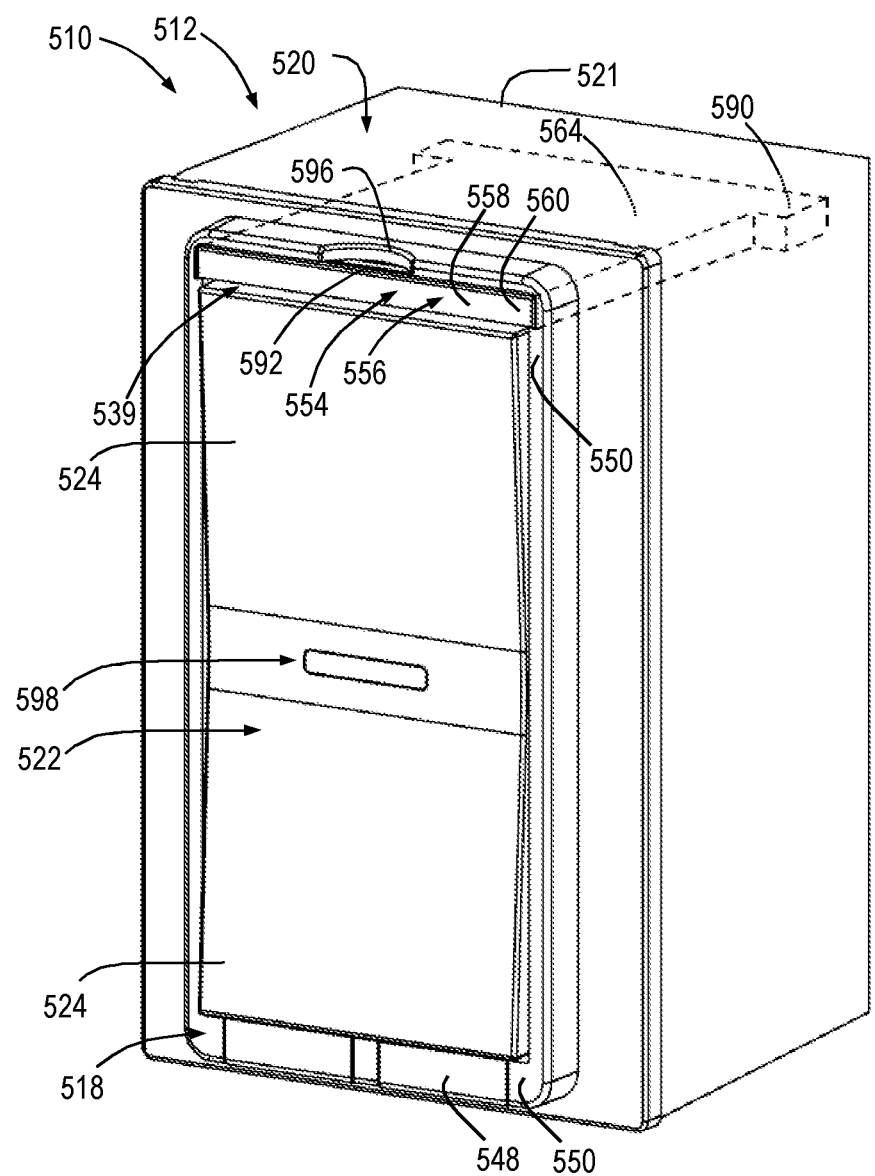
FIG. 5A is a perspective view of another smart device in a first state, in accordance with some embodiments.
Figure 5B:
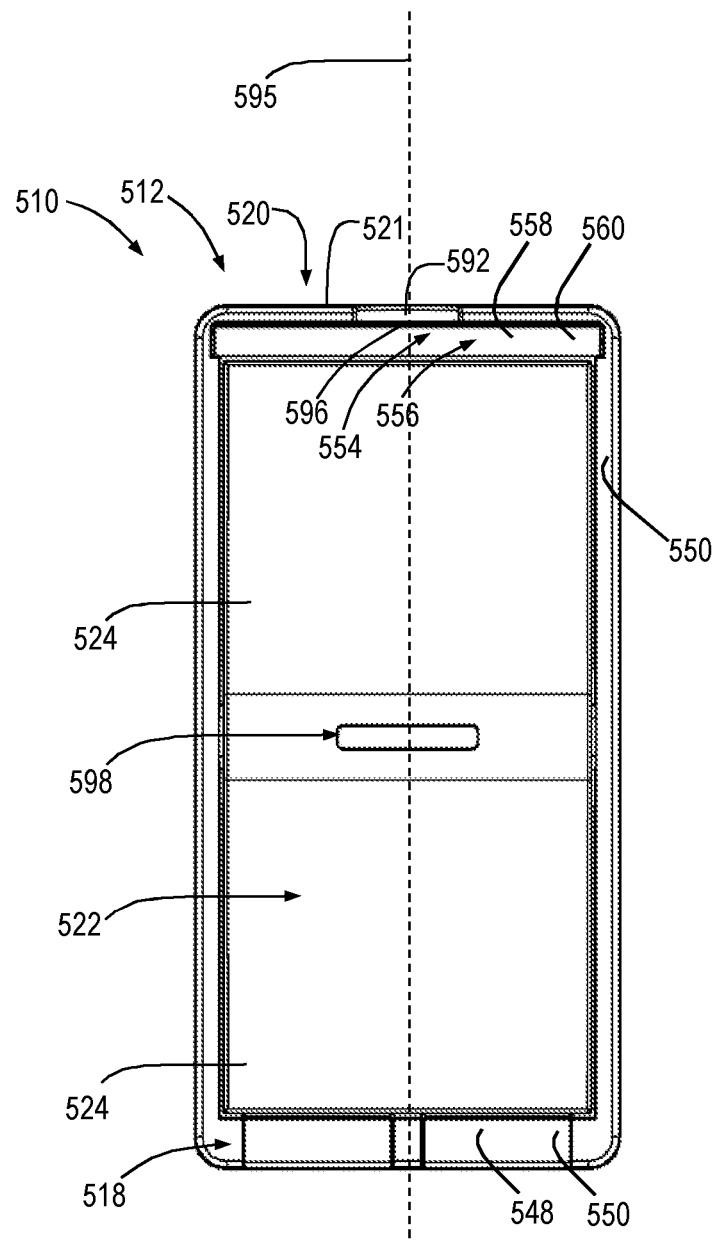
FIG. 5B is a front view of the smart device of FIG. 5A.
Figure 5C:
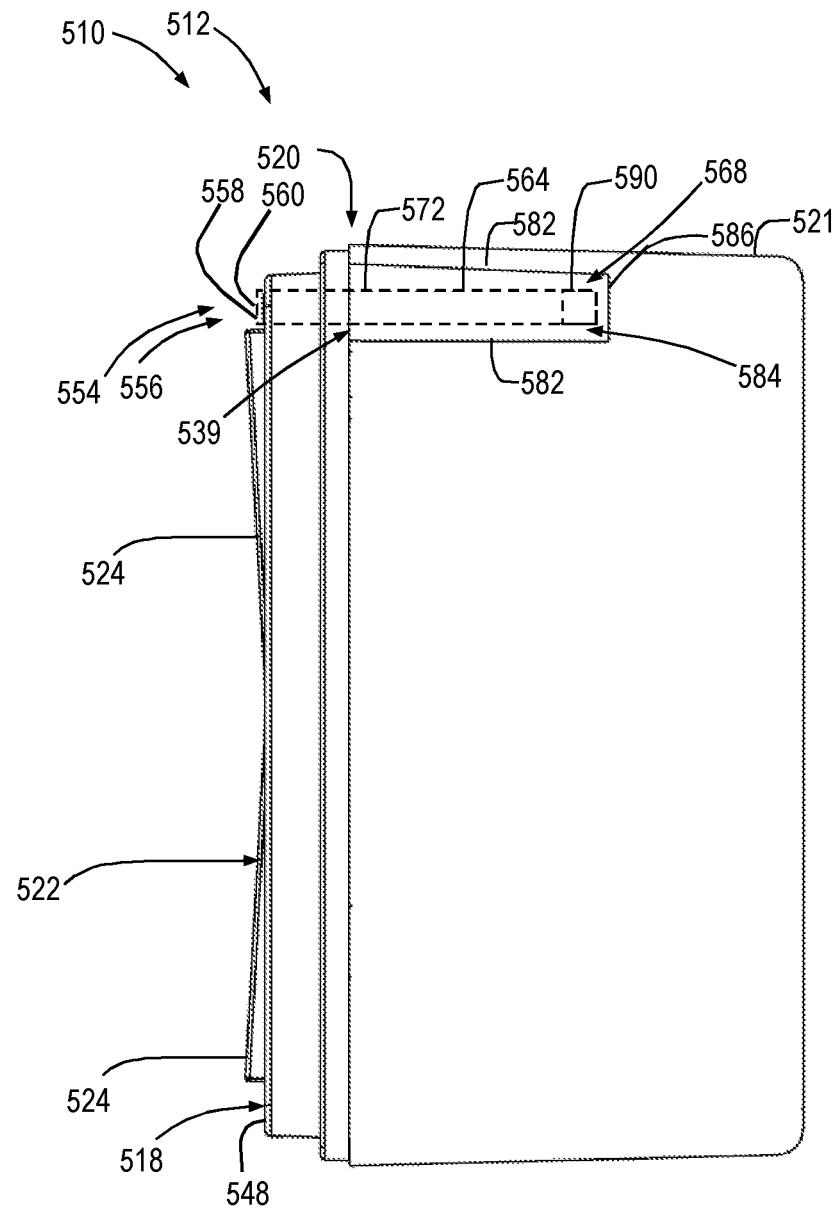
FIG. 5C is a side front view of the smart device of FIG. 5A.
Figure 5D:
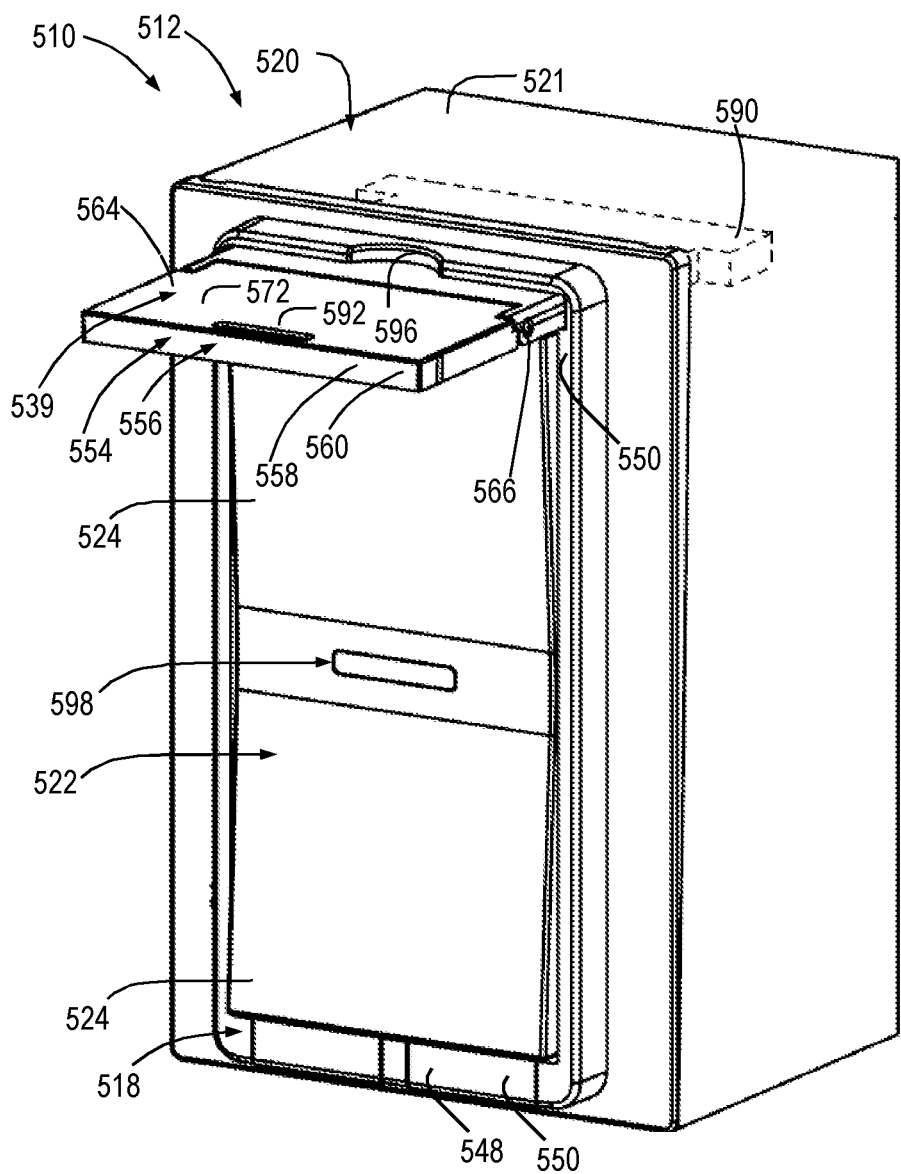
FIG. 5D is a perspective view of the smart device of FIGS. 5A-5C in a second state, in accordance with some embodiments.
Figure 5E:
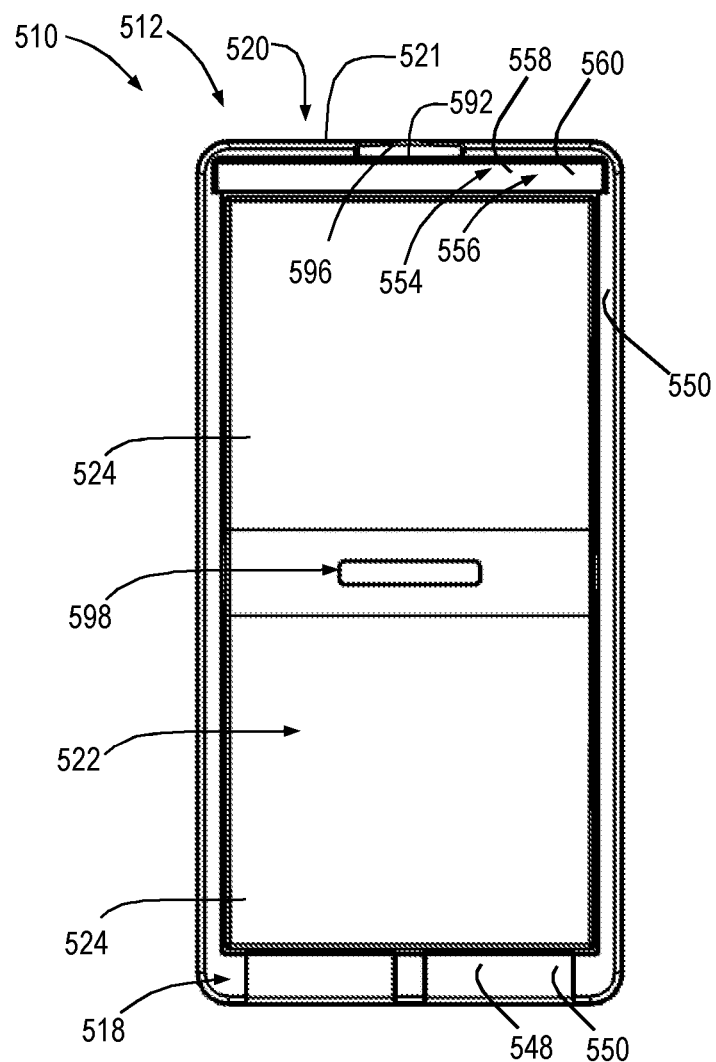
FIG. 5E is a front view of the smart device of FIG. 5D.
Figure 5F:
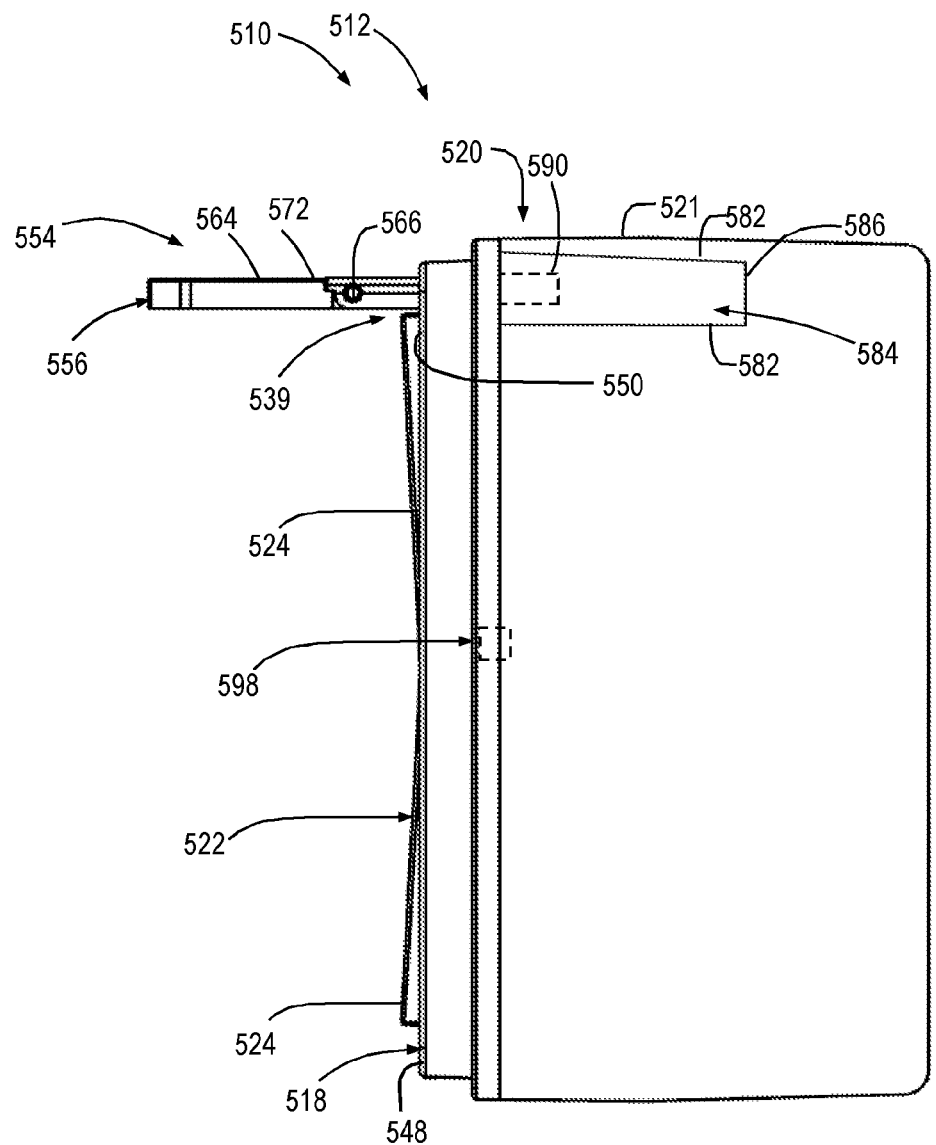
FIG. 5F is a side front view of the smart device of FIG. 5D.
Figure 5G:
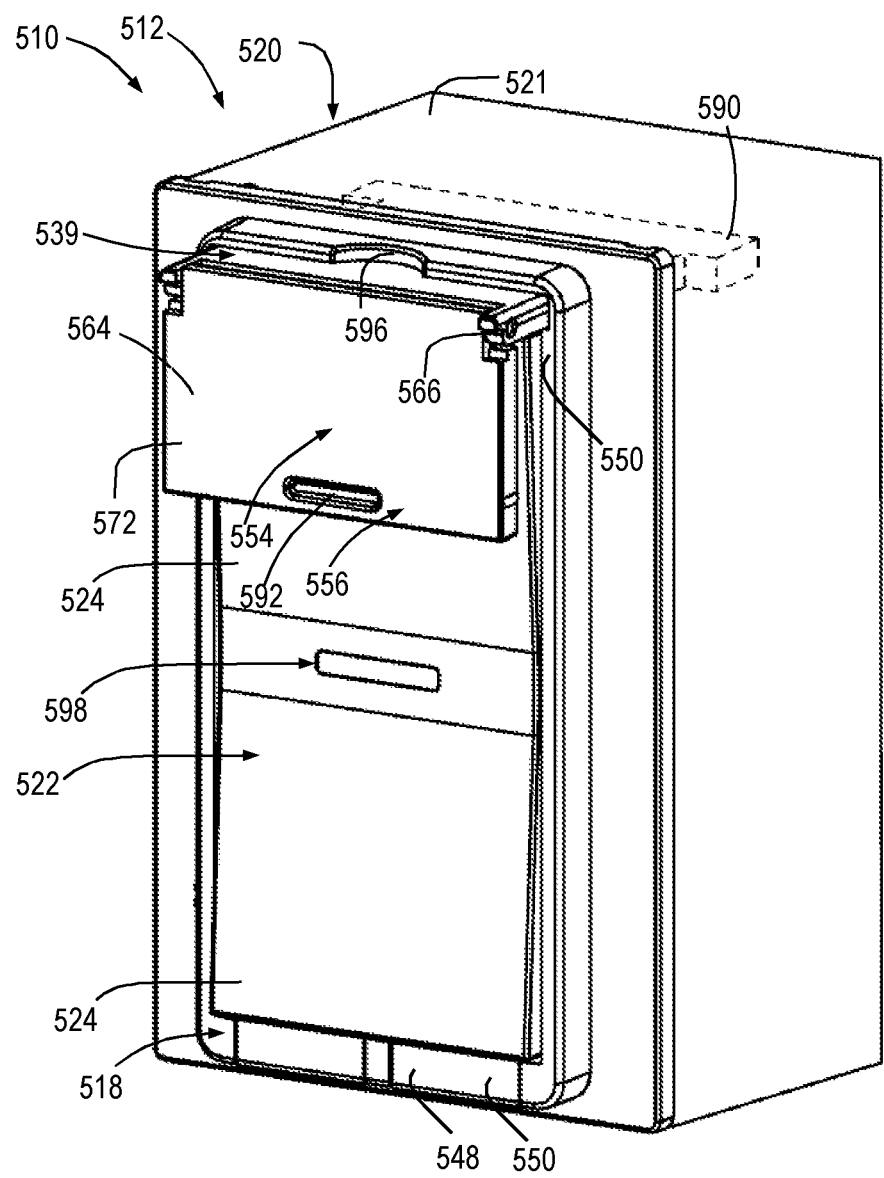
FIG. 5G is a perspective view of the smart device of FIGS. 5A-5C in a third state, in accordance with some embodiments.
Figure 5H:
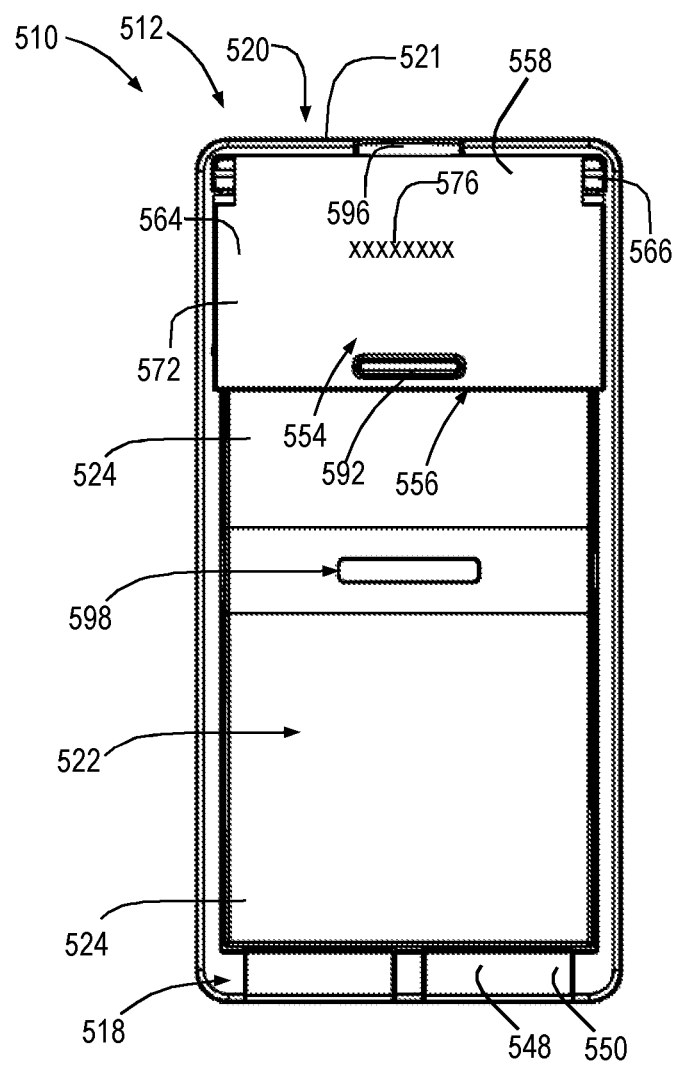
FIG. 5H is a front view of the smart device of FIG. 5G.
Figure 5I:
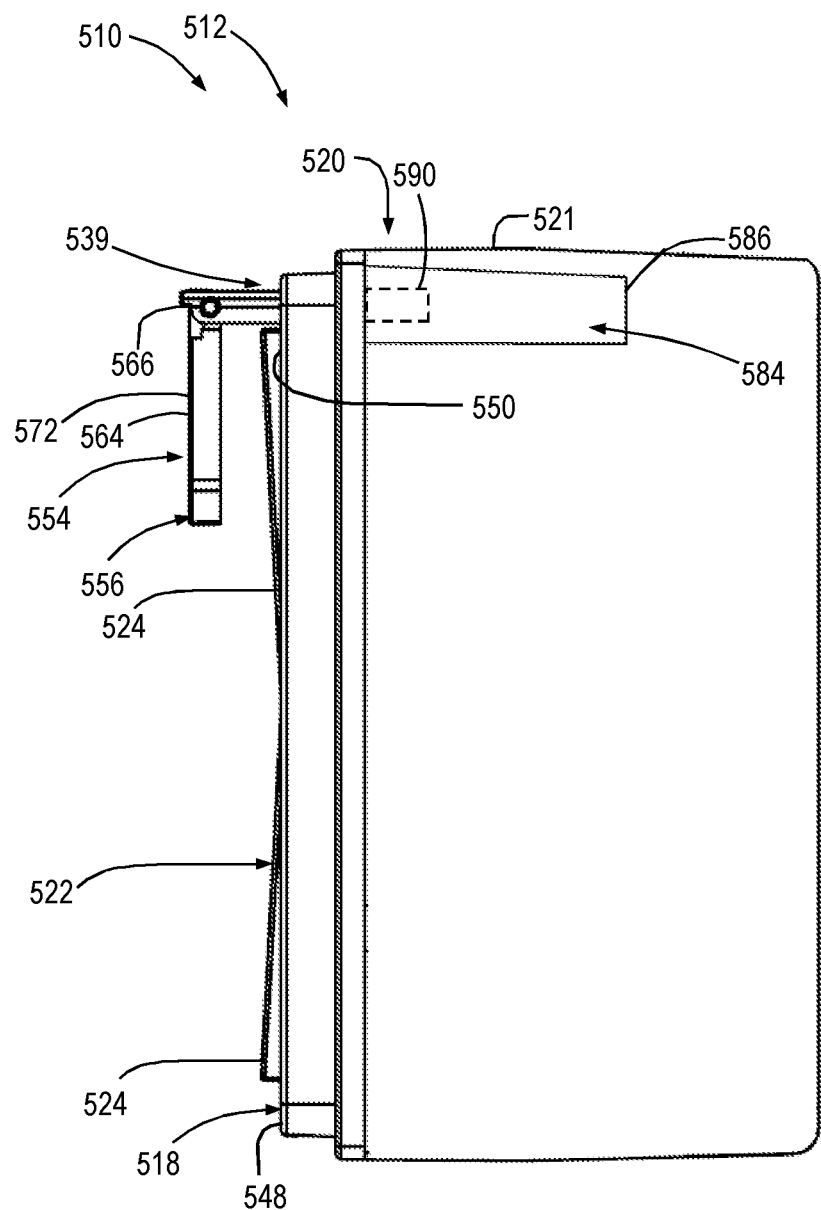
FIG. 5I is a side front view of the smart device of FIG. 5G.

FIGS. 5A-5C show the smart device 510 in a first state, in which the information tab 554 is retracted and in a first position, in accordance with some embodiments. FIGS. 5D-5F show the smart device 510 in a second state, in which the information tab 554 is in an extended state and in a second position, in accordance with some embodiments. FIGS. 5G-5I show the smart device 510 in a third state, in which the tab 554 is in an extended state and in a third position, in accordance with some embodiments.

FIGS. 6A-6F are views of another smart device 610 that includes a structure that can display device specific information that is accessible to a user after or while the smart device 610 is installed in or otherwise mounted on a wall, in accordance with some embodiments. The smart device 610 may be similar to the smart device 10 (except where otherwise noted, like reference numerals differing only by the presence of the numeral "6" in the hundreds place are used to indicate like or similar elements) described above in association with FIGS. 1A-1F except that (1) an extendable/retractable portion 664 of the information tab 654 extends outwardly solely by pivoting or otherwise rotating and (2) the bezel 618 includes a recess or other opening 696 in register or substantially in register with a grip 692 defined by the information tab 654 to allow easier access to the grip 692.

In some embodiments, the smart device 610 may further include a built-in lighting system that includes a light 698. The built-in lighting system may have features and/or may have methods of operation that are the same as or similar to (sometimes referred to herein as at least similar to) one or more features and/or one or more methods of operation in one or more embodiments of one or more lighting systems, or portion(s) thereof, built into one or more smart devices disclosed in any of the co-pending patent applications disclosed above, which as stated above, are expressly incorporated by reference in their entirety as part of the present disclosure. In some embodiments, the light 698 may have a circular shape as illustrated in the embodiment of FIGS. 6A-6F, or any other shape. In some embodiments, such as the embodiment illustrated in FIGS. 6A-6F, the light 698 may be disposed in a central, substantially central and/or any other portion(s) of a front surface of the smart device 610.

Figure 6A:
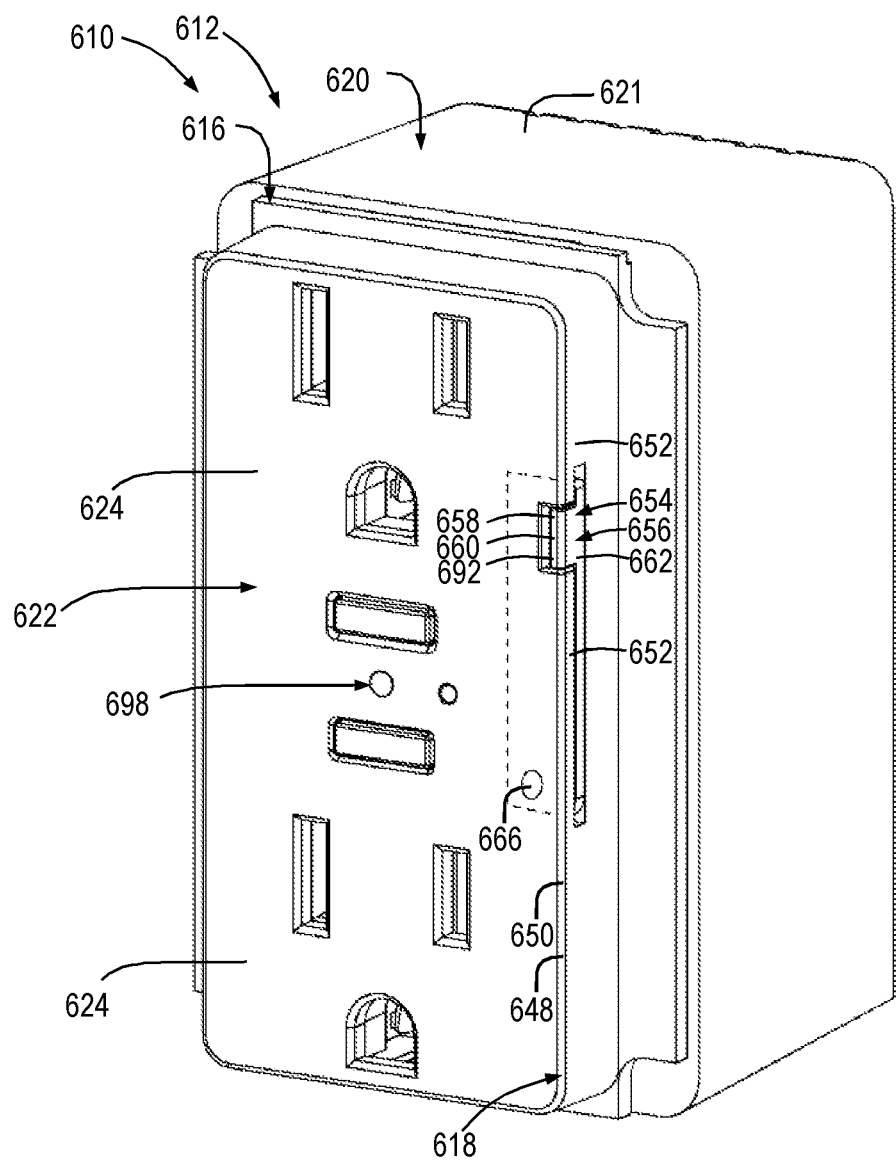
FIG. 6A is a perspective view of another smart device in a first state, in accordance with some embodiments.
Figure 6B:
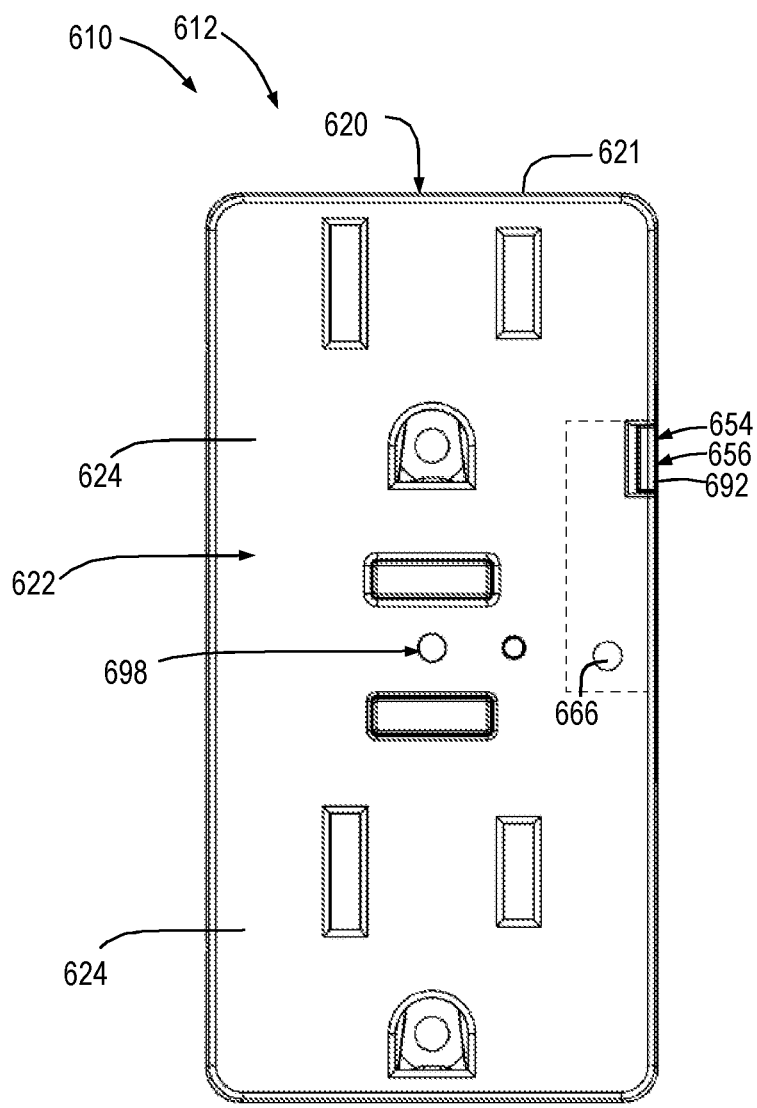
FIG. 6B is a front view of the smart device of FIG. 6A.
Figure 6C:
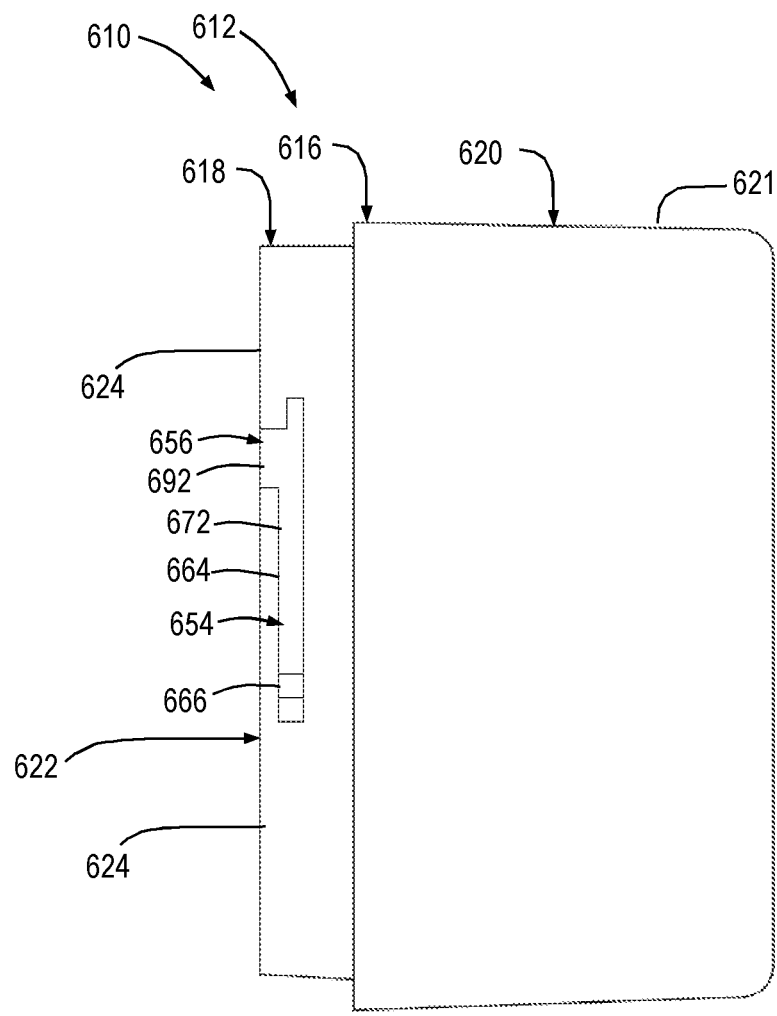
FIG. 6C is a side front view of the smart device of FIG. 6A.
Figure 6D:
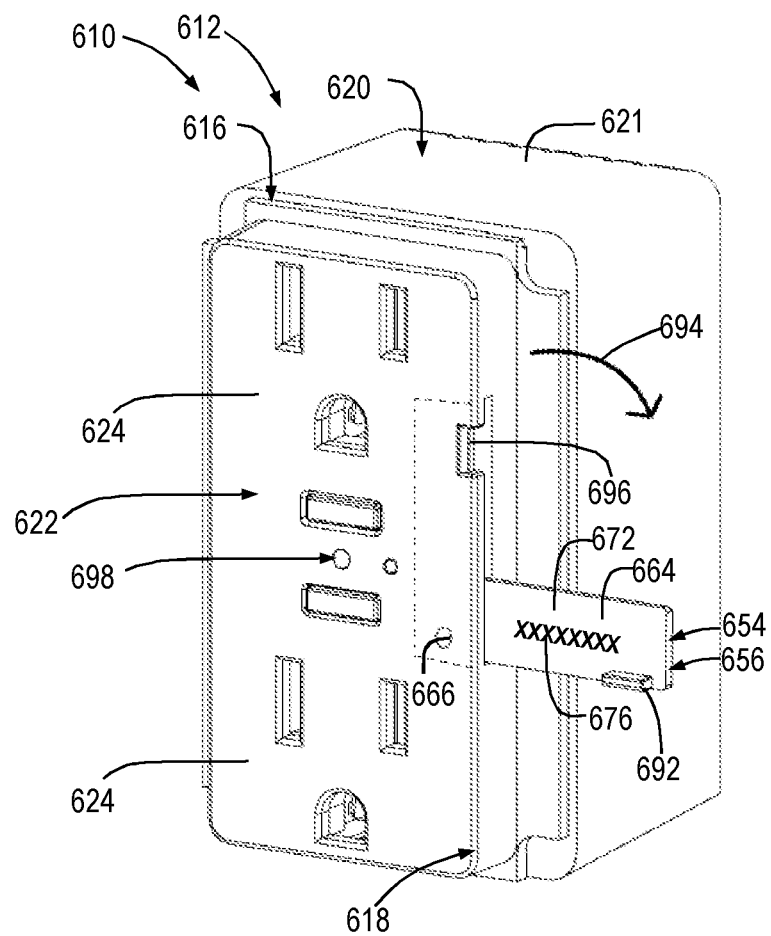
FIG. 6D is a perspective view of the smart device of FIGS. 6A-6C in a second state, in accordance with some embodiments.
Figure 6E:
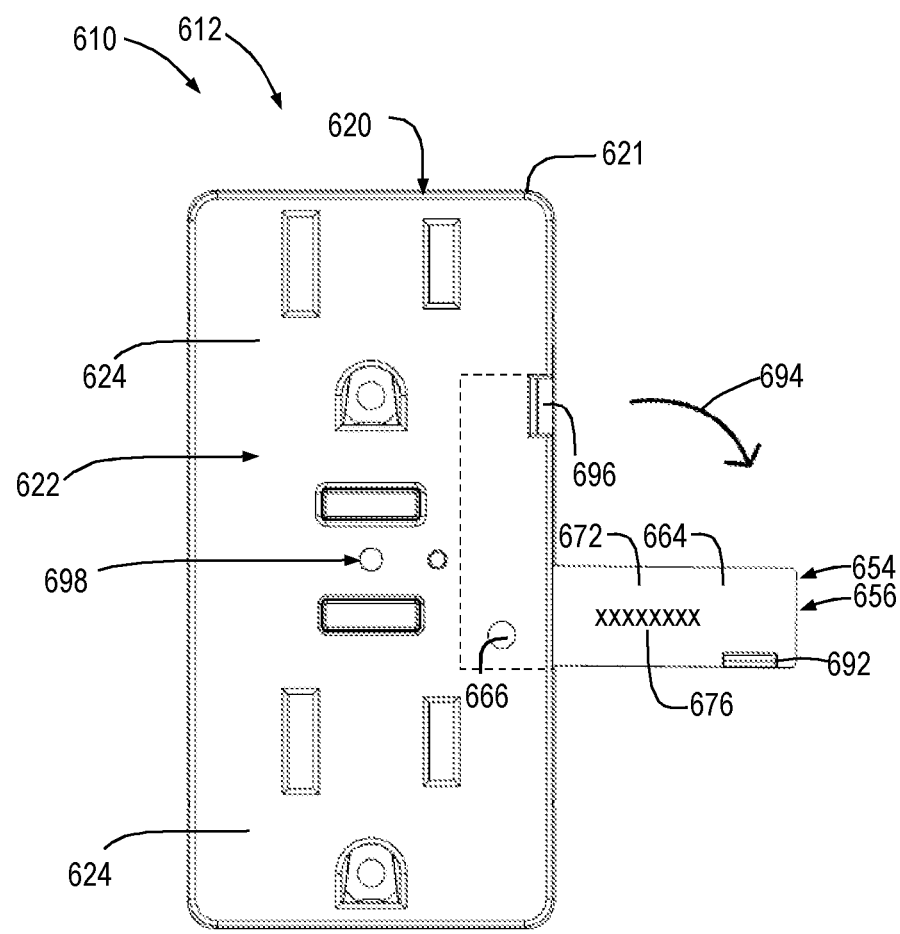
FIG. 6E is a front view of the smart device of FIG. 6D.
Figure 6F:
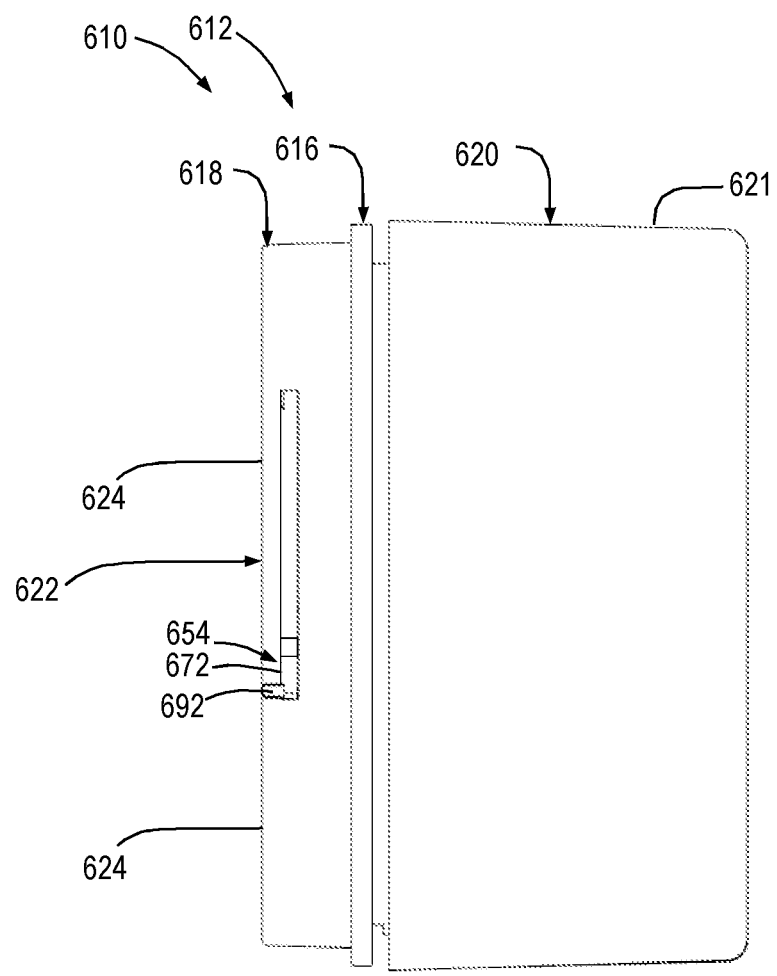
FIG. 6F is a side front view of the smart device of FIG. 6D.

FIGS. 6A-6C show the smart device 610 in a first state, in which the information tab 654 is retracted and in a first position, in accordance with some embodiments. FIGS. 6D-6F show the smart device 610 in a second state, in which the information tab 654 is in an extended state and in a second position, in accordance with some embodiments.

The term "smart device" is used herein to mean an electronic device that is connected to another device or network via a wireless protocol, such as Bluetooth, NFC, WiFi, 3G, LTE, etc. The term "smart switch" is used herein to mean a smart device that is, or includes a switch. The term "switch" is a device for turning on or off, directing an electric current, for making or breaking a circuit, or otherwise electrically controlling another device or appliance. The term "in-wall" is used herein to mean in or on a wall or like surface or structure, such as a panel or upright construction. Exemplary smart switches include, without limitation, on/off toggle, paddle or rocker switches (including single pole and double pole), dimmer switches (including single pole and double pole), combined on/off and dimmer switches, combined light switches and fan controls, combined light switches and other appliance controls, and wall outlets. The term "device specific information" is used herein to mean information specific to a particular smart device that is required to allow the respective smart device to provision/pair/authenticate/communicate/join a wireless network, such as a pin code, MAC address, serial number, IP address, service set identifier, QR code, barcode, data matrix, etc., as would be understood by those of ordinary skill in the art.

It should be understood that the smart device features disclosed herein can be used in any combination or configuration, and is not limited to the particular combinations or configurations expressly specified or illustrated herein.

Unless stated otherwise, terms such as, for example, "comprises," "has," "includes," and all forms thereof, are considered open-ended, so as not to preclude additional elements and/or features.

Also unless stated otherwise, terms such as, for example, "in response to" and "based on" mean "in response at least to" and "based at least on," respectively, so as not to preclude being responsive to and/or based on, more than one thing.

As may be recognized by those of ordinary skill in the pertinent art based on the teachings herein, numerous changes and modifications may be made to the above-described and other embodiments of the present invention without departing from its scope as defined, for example, in the appended claims. For example, the smart device or smart switch may take the form of any of numerous different smart devices or smart switches that are currently known, or that later become known. The information tab or panel may take the form of any of numerous different tabs, panels or other structures that can display device specific information, that can be mounted in or on a smart device in any of numerous different ways, that are currently known or that later become known. In addition, the tab or panel may be movable between concealed and exposed positions or another component or structure of the smart device may be movable between a position where the device specific information is concealed or is in a concealed condition, and another position where the device specific information is exposed or is an exposed condition. Accordingly, this detailed description of embodiments is to be taken in an illustrative, as opposed to a limiting sense.

What is claimed is:

1. An in-wall smart device comprising:
    a smart device assembly or housing mountable on or within a wall or panel; and
    an information tab or panel displaying thereon smart device specific information capable of being used to perform one or more of provision, pair, authenticate, communicate or join a network;
    wherein, in a first state in which the smart device is mounted on or within the wall or panel, the smart device specific information is concealed, and in a second state in which the smart device is mounted on or within said wall or panel, the smart device specific information is exposed for viewing.

2. The in-wall smart device as defined in claim 1, wherein the smart device is a smart switch.

3. The in-wall smart device as defined in claim 2, wherein the smart switch is at least one of a single or double on/off toggle, paddle or rocker switch, a single or double pole dimmer switch, a combined on/off and dimmer switch, a combined light switch and fan control, a combined light switch and other appliance control, or wall outlet.

4. The in-wall smart device as defined in claim 1, wherein the information tab or panel defines (i) a first condition or position where the device specific information is concealed, and (ii) a second condition or position where the device specific information is exposed for viewing.

5. The in-wall smart device as defined in claim 4, wherein the smart device is a smart switch including a bezel, and the tab or panel is movable between the first position where it is retracted within the bezel and the device specific information is concealed, and the second position where the tab or panel extends outwardly of the bezel and the device specific information is exposed for viewing.

6. The in-wall smart device as defined in claim 5, wherein the tab or panel includes an exterior surface, and with the tab or panel in the first position, a portion of the exterior surface of the tab or panel is flush or substantially flush with a surface of the bezel.

7. The in-wall smart device as defined in claim 6, wherein the exterior surface of the tab or panel includes a grip that is manually engageable by a finger, fingernail or hand-held device to engage and move the tab or panel from the first to the second position.

8. The in-wall smart device as defined in claim 7, wherein the grip defines a recess that is engageable by a pen, paperclip or similar tool.

9. The in-wall smart device as defined in claim 7, wherein the grip is defined by a fingernail groove formed in an exterior surface of the tab or panel.

10. The in-wall smart device as defined in claim 7, wherein the tab or panel is snap fit and releasably retained within the bezel in the second position.

11. The in-wall smart device as defined in claim 4, wherein the tab or panel is formed of a flexible sheet material.

12. The in-wall smart device as defined in claim 11, wherein the sheet material is a polymeric material.

13. The in-wall smart device as defined in claim 4, wherein in the second position, the tab or panel is removable from the smart device.

14. The in-wall smart device as defined in claim 4, wherein the tab or panel is spring loaded and biased in the direction from the first position toward the second position.

15. The in-wall smart device as defined in claim 14, wherein in the first position, the tab or panel is depressible to release the tab or panel from the first position and allow the spring to move the tab or panel from the first position to the second position.

16. The in-wall smart device as defined in claim 1, wherein the tab or panel displays the smart device specific information on a surface that is approximately rectangular and defines a width of at least about 2.8 mm, and a length of at least about 21.5 mm.

17. The in-wall smart device as defined in claim 1, wherein the information tab or panel is configured so that the device specific information is accessible to a user while the smart device is mounted on or within the wall or panel without moving the smart device from its position on or within said wall or panel.

18. An in-wall smart device comprising:
a smart device assembly or housing mountable on or within a wall or panel; and
first means for displaying thereon smart device specific information capable of being used to perform one or more of provisioning, pairing, authenticating, communicating or joining a network, wherein, in a first state in which the smart device is mounted on or within the wall or panel, the smart device specific information is concealed, and in a second state in which the smart device is mounted on or within said wall or panel, the smart device specific information is exposed for viewing.

19. The in-wall smart device as defined in claim 18, further comprising second means for defining (i) a first condition or position where the device specific information is concealed, and (ii) a second condition or position where the device specific information is exposed for viewing.

20. The in-wall smart device as defined in claim 18, wherein the first means is a tab or panel, and the second means is a recess in the smart device assembly or housing that slidably receives the tab or panel in the first position, and allows the tab or panel to slidably move within the recess between the first and second positions.

21. The in-wall smart device as defined in claim 18, wherein the first means is configured so that the device specific information is accessible to a user while the smart device is mounted on or within the wall or panel without moving the smart device from its position on or within said wall or panel.

22. An in-wall smart device comprising:
an assembly including:
a body installable in a wall; and
an information tab that is accessible within the body installed in the wall and displays smart device specific information;
wherein, in a first state in which the assembly is installed in the wall, the smart device specific information is concealed, and in a second state in which the assembly is installed in said wall, the smart device specific information is exposed for viewing.

23. The in-wall smart device as defined in claim 22, wherein the body is installable within the wall is installable in a wall mounted electrical box.

24. The in-wall smart device as defined in claim 22, wherein the smart device is a smart switch.

25. The in-wall smart device as defined in claim 24, wherein the smart switch is a single or double on/off toggle, a paddle or rocker switch, a single or double pole dimmer switch, or a wall outlet.

26. The in-wall smart device as defined in claim 22, wherein the information tab is movable relative to the body.

* * * * *

UNITED STATES PATENT AND TRADEMARK OFFICE
CERTIFICATE OF CORRECTION

PATENT NO. : 10,256,862 B2  
APPLICATION NO. : 15/254445  
DATED : April 9, 2019  
INVENTOR(S) : Michael Daigle et al.

Page 1 of 1

It is certified that error appears in the above-identified patent and that said Letters Patent is hereby corrected as shown below:

On the Title Page

Item (73), please insert --, LLC-- after "iDevices"

Signed and Sealed this  
Fourteenth Day of July, 2020

Andrei Iancu  
*Director of the United States Patent and Trademark Office*